(12) United States Patent
Simburger et al.

(10) Patent No.: US 8,180,505 B2
(45) Date of Patent: May 15, 2012

(54) SPACECRAFT SOLAR CELL MONITORING SYSTEM

(75) Inventors: Edward J. Simburger, Agoura, CA (US); Daniel L. Rumsey, Inglewood, CA (US); Simon H. Liu, Redondo Beach, CA (US); John S. Halpine, Hermosa Beach, CA (US)

(73) Assignee: The Aerospace Corporation, El Segundo, CA (US)

( * ) Notice: Subject to any disclaimer, the term of this patent is extended or adjusted under 35 U.S.C. 154(b) by 1215 days.

(21) Appl. No.: 11/983,183

(22) Filed: Nov. 7, 2007

(65) Prior Publication Data

US 2009/0119060 A1    May 7, 2009

(51) Int. Cl.
*G06F 17/00* (2006.01)
*H01L 31/042* (2006.01)
*H04B 7/185* (2006.01)

(52) U.S. Cl. ........... 701/13; 701/3; 701/4; 701/15; 136/244; 136/246; 136/292; 244/158.4; 244/158.5; 244/158.6; 356/138; 356/139.01; 323/906

(58) Field of Classification Search .......... 701/3, 4, 701/13, 15; 136/292, 244, 246; 244/158.4–158.6; 342/352, 355, 357.2–357.78; 323/906; 356/138, 356/139.01
See application file for complete search history.

(56) References Cited

U.S. PATENT DOCUMENTS

| | | | | |
|---|---|---|---|---|
| 5,394,075 A | * | 2/1995 | Ahrens et al. | 320/101 |
| 5,919,314 A | * | 7/1999 | Kim, II | 136/246 |
| 6,127,621 A | * | 10/2000 | Simburger | 136/246 |
| 6,218,605 B1 | * | 4/2001 | Dally et al. | 136/244 |
| 2007/0044837 A1 | * | 3/2007 | Simburger et al. | 136/292 |

* cited by examiner

*Primary Examiner* — John Nguyen
*Assistant Examiner* — Chuong Nguyen
(74) *Attorney, Agent, or Firm* — Sutherland, Asbill & Brennan LLP

(57) ABSTRACT

An onboard solar cell array current and voltage characteristic determination method is preferably used on small spacecraft and determines the solar cell orientation relative to the sun by a comparison between prelaunch solar cell characteristics with on-orbit solar cell characteristics well suited for spin axis determinations and monitoring the degradation of on-orbit solar cells over the operational life of a picosatellite.

19 Claims, 2 Drawing Sheets

RELATIVE SUN ANGLE DETERMINATION PROCESS

PRELAUNCH CALIBRATION SYSTEM

SOLAR CELL CURRENT

SPACECRAFT SOLAR CELL MONITORING SYSTEM

STATEMENT OF GOVERNMENT INTEREST

The invention was made with Government support under contract No. FA8802-04-C-0001 by the Department of the Air Force. The Government has certain rights in the invention.

FIELD OF THE INVENTION

The invention relates to the field of power collection. More particularly, the present invention relates to solar cell array characteristics and monitoring on small spacecraft.

BACKGROUND OF THE INVENTION

In U.S. Pat. No. 6,127,621, Simburger describes a distributed power system where a ring bus was used to connect multiple DC-DC converters in parallel and where each DC-DC converter was connected to a solar cell or battery. The picosatellites have a distributive power system that is charged by solar cells. The distributed power system is well suited for small spacecraft. Simburger describes the electronic hardware required for measuring the current and voltage characteristics of solar cells used to power a picosatellite. When the current and voltage characteristics are to be used to measure degradation in the performance of the solar cells then accurate knowledge of the angle between solar incident rays and the plane of the solar cells is required. The solar cell on-orbit is monitored while the picosatellite is spinning and stabilized around a spin axis. However, there is no attitude control system on picosatellites. As such, the angle of solar incident is unknown and degradation in the performance can not be monitored.

Picosatellites do not have any attitude control or an attitude determination system. The picosatellite will have some rotational motion imparted upon the picosatellite during ejection from the launch vehicle. This rotational motion will remain unimpeded for the operational life of the picosatellite with only minor variation that would be caused by such factors as atmospheric drag, impact with the solar wind, interaction with the earth's magnetic field, and gravity effects. Over relatively short periods of time, these effects can be ignored. Over longer periods of time, the changes in the spin rate of the spacecraft can be measured from available data.

The picosatellite can provide available data as to measured current and voltage characteristics. Because the picosatellite does not provide means determining the sun angular solar incident, the picosatellite does not provide means for determining the performance of operational solar cells. Maintenance of high performance solar cells is required to keep a picosatellite fully operational over an expected operational life. There exists a need to monitor the performance of onboard solar cells. Yet, existing picosatellite designs do not provide attitude control necessary for determining the angular solar incidence necessary for determining expected degradation of solar cell performance. These and other disadvantages are solved or reduced using the invention.

SUMMARY OF THE INVENTION

An object of the invention is to provide a method for monitoring solar cell performance.

Another object of the invention is to provide a method for monitoring solar cell performance while onboard a picosatellite.

Yet another object of the invention is to provide a method for monitoring solar cell performance while onboard a picosatellite using a prelaunch calibration lookup table.

Still another object of the invention is to provide a method for monitoring solar cell performance while onboard a picosatellite using prelaunch calibration lookup table that records initial solar cell performance as a function of angular solar incidence.

A further object of the invention is to provide a method for monitoring solar cell performance while onboard a picosatellite using prelaunch calibration lookup table that records initial solar cell performance as a function of angular solar incidence for initial determination of the angular solar incidence.

Yet a further object of the invention is to provide a method for monitoring solar cell performance while onboard a picosatellite using prelaunch calibration lookup table that records initial solar cell performance as a function of angular solar incidence for initial determination of the angular solar incidence that is then used to monitor degradation of the solar cells during the remaining operational life of the picosatellite.

The invention is directed to a method for monitoring the performance of an onboard solar cell array. The method monitors solar cell performance while onboard a picosatellites using a prelaunch calibration lookup table that records initial solar cell performance as a function of angular illumination incidence. The solar cell performance is reflected by current and voltage characteristics relative to an angle of solar incidence. The calibration lookup table is used for comparison to initial on-orbit performance for initial determination of the angular solar incidence. After the angular solar incidence angle is initially determined, then the solar incident angle in combination with measured current and voltage characteristics as compared to the prelaunch lookup table voltage and current characteristics determines the extent of degradation. The repeated sensing of the voltage and current characteristics can be performed on-orbit so as to then monitor the solar cells over time for determining the initial performance and the subsequent degradation of the solar cells during the remaining operational life of the picosatellite. These and other advantages will become more apparent from the following detailed description of the preferred embodiment.

DETAILED DESCRIPTION OF THE PREFERRED EMBODIMENT

Figure 1:
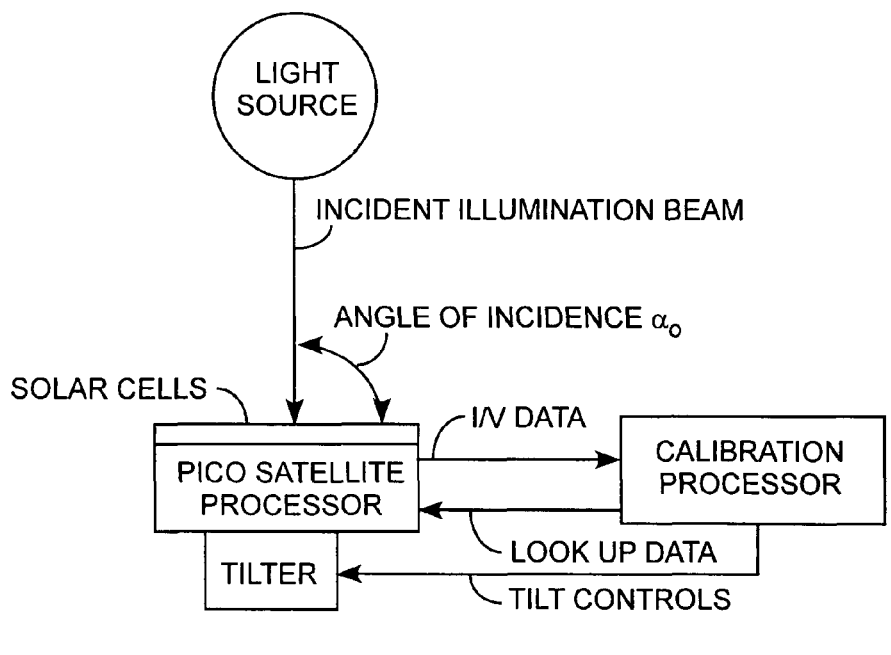
FIG. 1 is a block diagram of a prelaunch calibration system.

An embodiment of the invention is described with reference to the figures using reference designations as shown in the figures. Referring to FIG. 1, a calibration system is used to determine the initial performance characteristics of solar cells prior to launch. The solar cells are preferably aligned in a solar cell array. A calibration processor is used to tilt a solar cell or array that can be attached to a picosatellite processor. A light source provides an incident illumination beam that impinges upon the solar cells at an $\alpha_o$ angle of incidence. The solar cells array provides current I and voltage V data characteristics I/V to the calibration processor for each angle of incidence. For each angle of incidence, lookup data is loaded into a lookup table in the picosatellite processor. Prior to flight, the performance of the solar cells is accurately measured preferably using a calibrated air mass zero solar simulator. The current and voltage characteristics are measured for each incident angle from 0° to 90° in five-degree increments. These measurements will determine the peak power point (Pmax) and short circuit current (Isc) at each angle of incidence. The intensity of the illumination beam is held constant during the prelaunch calibration process.

Figure 2:
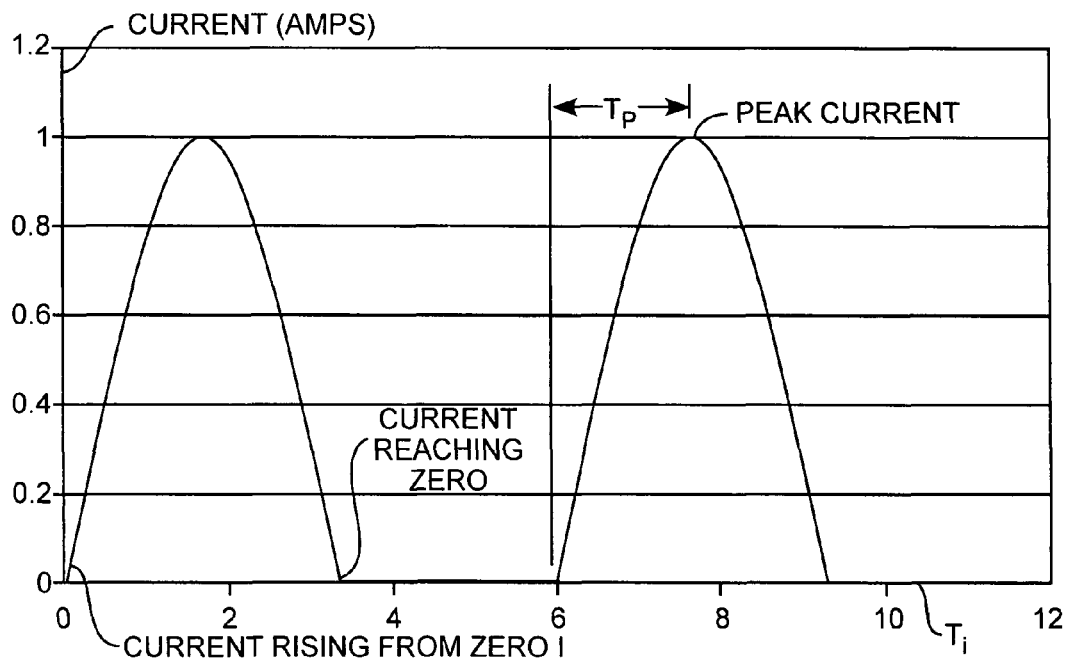
FIG. 2 is a plot of current over time of a solar cell.

Referring to FIGS. 1 and 2, a spinning picosatellite has a spin axis at a spin rate. The solar cells can be mounted on each of four sides around the picosatellite. The sun will illuminate at most two sides of the picosatellite on which solar cells are mounted. During each rotation, the current provided by the solar cells rises from zero current to a peak current and returns to zero current during a first half of a rotation. During a second half of the rotation, when sun illumination does not illuminate the solar cells, the current from the solar cells is zero. During each rotation, the peak current occurs at a peak time Tp. At the peak time, the solar cell provides maximum power Pmax. At the peak time, with the solar cells shorted, the solar cell current is the short circuit current ISc.

Figure 3:
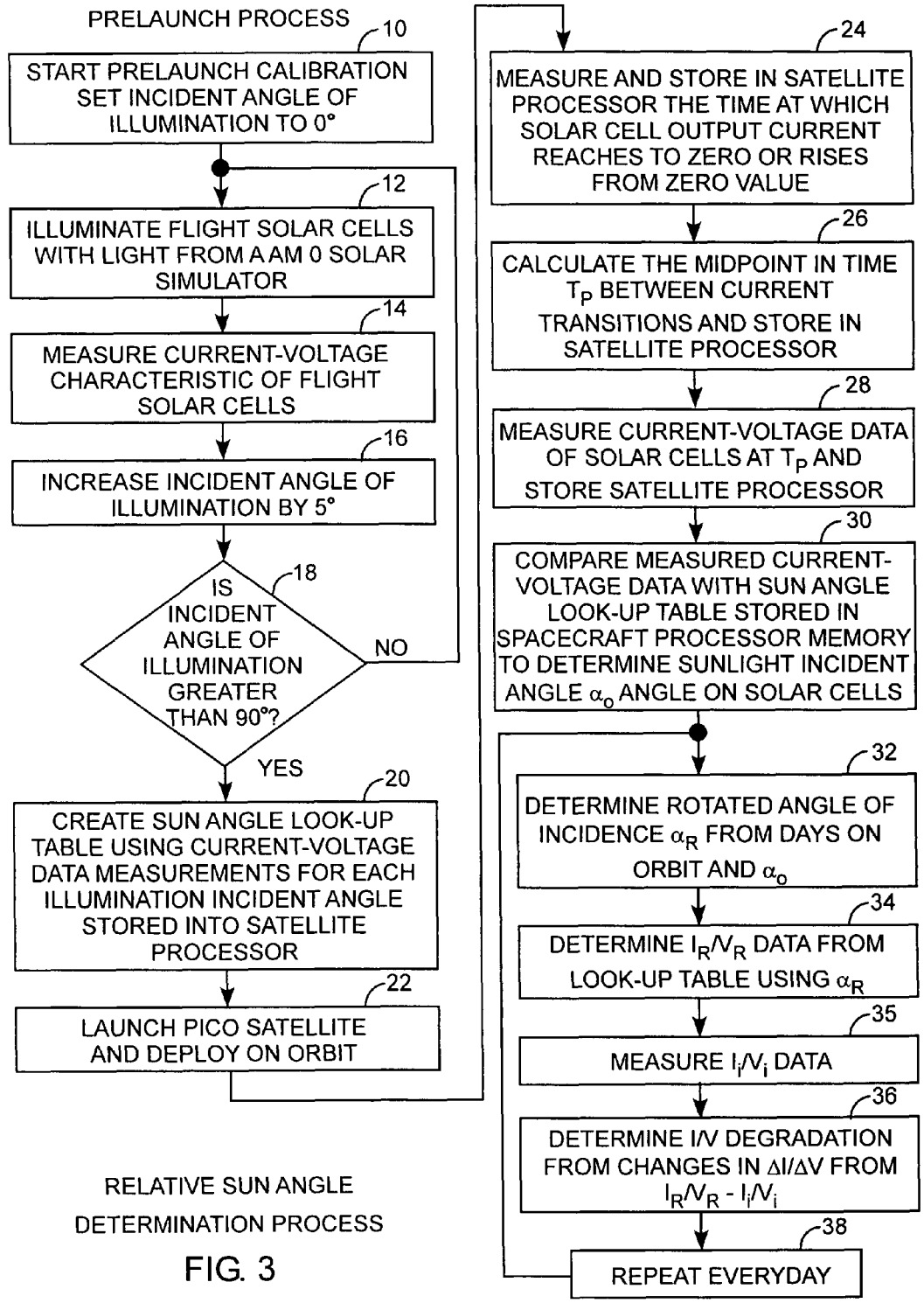
FIG. 3 is flow chart of a sun angle determination process.

Referring to FIGS. 1, 2, and 3, and more particularly to FIG. 3, a prelaunch process starts with prelaunch calibration 10 where the illumination angle is initially set to 0° by tilting. The light source intensity is set to a constant level for illuminating 12 the solar cells. The calibration process measures 14 the I/V characteristics by recording the current and voltage at each tilt angle. After recording the peak power Pmax and short circuit current Isc for the current tilt angle, the solar cells are tilted more by a tilt angle increment. The tilt angle increment is preferably five degrees but is usually in the range of one to ten degrees. The prelaunch process tilts the solar cells until 18 the current tilt angle is 90°. At the end of the incremental tilts, the calibration processor stores 20 a lookup table in the picosatellite processor. The lookup table is indexed by tilt angle having peak power Pmax and short circuit current Isc data entries. After the creation 20 of the onboard lookup table, the picosatellite is then launched 22 into orbit.

After launching into orbit, the picosatellite will have a spin rate, a solar incident angle by virtue of an axis of rotation, current and voltage sensing capabilities, and a lookup table indexed by incident angle and having a peak power Pmax and short circuit current Isc. The solar array current that is produced by cells mounted on one of the picosatellite faces will vary over time from zero to a peak current value and then back to zero during each rotation. An incidence time Ti starts a rotation cycle when the current is rising from zero. The current output from the solar cells is sensed at points along time Ti during each rotation. During each rotation, the current transits to zero, transits from zero, and reaches a peak. These conditions can be used to determine the period of each rotation. Preferably, the peak time is determined 26 by current transitions to and from zero current. From the times of the current transitions, the rotation period can be determined. The rotation spin rate of the picosatellite can be determined directly from the rotation period.

After determining peak time Tp, the current and voltage levels are sensed 28 to measure the peak power Pmax. The solar cells are then short circuited so as to sense the short circuit current ISc at the peak time Tp. There are many possible computation methods for determining the peak time. For example, the time of the first zero rising crossing time can be t1 and the second zero falling crossing can be t2. The peak time Tp of the occurrence of peak current production can be established as Tp=t1+(t2−t1)/2. Thus, with simple algebraic computation, the peak time Tp at the peak current for the rotating picosatellite can be determined by simply sensing zero crossings of the output current.

A side of the four-sided picosatellite will be facing the sun and will be normal to the sun around the spin axis. The solar incident angle between the picosatellite side that is facing the sun and the satellite-to-sun line-of-sight can be determined by looking up the angle index to peak power Pmax and short circuit current Isc equaling the sensed Pmax and Isc. The measured short circuit currents and peak power for all angles measured prior to launch are stored in the lookup table in memory of the processor of the picosatellite. The picosatellite processor can determine the tilt angle between the picosatellite side and the line of sight between the picosatellite and the sun. The tilt angle is also the spin axis. The sensing of the short circuit current at that instant in time at the peak time provides a measured Isc. The sensing of the output current and voltage at the peak time provides a measured Pmax and the maximum power Pmax is the product of the voltage and current at the peak time. The measured Pmax and measured Isc are used to search the lookup table for an angle index indicating the spin axis of the picosatellite. Once the angle between the sun and the picosatellite side with the solar cells is known, then the current and voltage characteristics can be subsequently measured on-orbit and subsequently compared with the prelaunch current and voltage characteristics for determining an amount of degradation of the solar cells over time during the operational life of the picosatellite.

A pico satellite will remain stable in an orientation in inertial space over a relatively long period of time because of the small size and high relative mass of the picosatellite. A measure of orbit stability can be estimated by trending the rotational spin rate of the picosatellite over time. The spin axis orientation in inertial space remains nearly constant. Thus, any changes in the current and voltage characteristic of the solar cells mounted on the picosatellite would be due to interactions between the solar cells and the space environment. These interactions and solar cell performance can be determined by comparison to initial characteristics over time.

One effect that changes the solar incidence over a rotation is the effect of the earth orbiting the sun. The changes in the incident angle of the sunlight changes with the position of the earth during each earth orbit around the sun. That is, the sun angle changes due to the orbital earth position around the sun. The solar incident angle change $\alpha_R$ due to the earth orbiting the sun is well known. The solar incident angle change $\alpha_R$ can be calculated with high precision. Thus, the position of the earth in the earth orbit around the sun provides a solar incident angle change $\alpha_R$ that can be accounted for in the calculation of the sun angle as the picosatellite mission progresses. After determining the initial incident angle $\alpha_o$, the incident angle $\alpha_o$ is merely adjusted by the subsequently determined sun incident angle change $\alpha_R$. The sun incident angle change $\alpha_R$ can be determined from the initial incident angle $\alpha_o$ and the number of days since deployment of the picosatellite.

The invention is directed to a method for determining an initial solar incident angle that can then be used to monitor the performance of an onboard solar array using ground based calibration data stored in an onboard lookup table. While various computation methods can be used, the method requires storing an incident angle indexed lookup table of current and voltage characteristics. In the preferred form, sensed current and voltage at maximum power at a peak time, and, sensed short circuit at the peak time are used. Those skilled in the art can make enhancements, improvements, and modifications to the invention, and these enhancements, improvements, and modifications may nonetheless fall within the spirit and scope of the following claims.

What is claimed is:

1. A method for determining the spin axis of a satellite powered by a solar cell, the method comprising the steps of:
   tilting, by a calibration processor, the solar cell relative to a calibration illuminating beam for illuminating the solar cell at tilt incident angles,
   measuring, by the calibration processor, characteristics of the solar cell by illuminating the solar cell at the tilt incident angles, the characteristics being indexed to the tilt incident angles,
   storing, in a lookup table associated with the satellite, the characteristics onboard the satellite, wherein the tilting, the measuring, and the storing are performed prior to launching the satellite into orbit having an initial spin rate and an initial solar incident angle,
   sensing, by a satellite processor associated with the satellite, voltage and current from the solar cell during an on-orbit rotation of the satellite,
   determining, by the satellite processor, the characteristics from the sensed voltage and current, and
   looking up, in the lookup table by the satellite processor, a tilt incident angle indexed to the characteristics, the looked up tilt incident angle being the initial solar incident angle.

2. The method of claim 1, wherein the characteristics comprise maximum power.

3. The method of claim 1, wherein the characteristics comprise short circuit current.

4. The method of claim 3, wherein:
   the current has zero crossing transitions during each rotation of the satellite, and the time between sequential zero crossing transitions determines a spin rate of the satellite,
   the current has a peak current during each rotation of the satellite,
   the current has peak currents for respective rotations,
   the time between sequential peak currents or zero crossing transitions determines a spin rate of the satellite, and
   the characteristics are determined at the peak currents.

5. The method of claim 4, wherein the tilt incident angles are arranged in five degree increments.

6. The method of claim 4, wherein the initial solar incident angle is adjusted by a solar incident angle change, the solar incident angle change is due to earth moving in an orbit around the sun.

7. The method of claim 4, wherein the solar cell is a solar cell array, and the satellite is a picosatellite.

8. The method of claim 4, wherein the solar cell is one of four solar cell arrays, and the satellite is a picosatellite.

9. The method of claim 4, wherein the characteristics are repetitively measured and compared to the initial characteristics for indicating an amount of degradation of the solar cell after the initial deployment and initial determination of the initial solar incident angle.

10. The method of claim 4, wherein the tilt incident angles are associated with a tilt angle increment of one to ten degrees.

11. The method of claim 1, wherein the tilt incident angles are arranged in five degree increments.

12. The method of claim 1, wherein the current has zero crossing transitions during each rotation of the satellite, and the time between sequential zero crossing transitions determines a spin rate of the satellite.

13. The method of claim 1, wherein the current has zero crossing transitions during each rotation of the satellite, the current has a peak current during each rotation of the satellite, the current has peak currents for respective rotations, and the time between sequential peak currents or zero crossing transitions determines a spin rate of the satellite.

14. The method of claim 1, wherein the current has zero crossing transitions during each rotation of the satellite, the current has a peak current at a peak current time during each rotation of the satellite, the current has peak currents and peak times for respective rotations of the satellite, time between sequential peak currents determines a spin rate of the satellite, and the characteristics are determined at the peak currents.

15. The method of claim 1, wherein the current has a peak current at a peak current time during each rotation of the satellite, the current has peak currents and peak times for respective rotations of the satellite, time between sequential peak currents determines a spin rate of the satellite, the characteristics are determined at the peak currents, and the characteristics comprise maximum power and short circuit current at the peak current times.

16. The method of claim 1, wherein the initial solar incident angle is adjusted by a solar incident angle change, the solar incident angle change is due to earth moving in an orbit around the sun.

17. The method of claim 1, wherein the solar cell is a solar cell array, and the satellite is a picosatellite.

18. The method of claim 1, wherein the characteristics are repetitively measured and compared to the initial characteristics for indicating an amount of degradation of the solar cell after the initial deployment and initial determination of the initial solar incident angle.

19. The method of claim 1, wherein the tilt incident angles are associated with a tilt angle increment of one to ten degrees.

* * * * *